US008831261B2

(12) United States Patent
Casebolt et al.

(10) Patent No.: US 8,831,261 B2
(45) Date of Patent: Sep. 9, 2014

(54) SPEAKER FEATURES OF A PORTABLE COMPUTING DEVICE

(75) Inventors: Matthew P. Casebolt, Fremont, CA (US); Ron A. Hopkinson, Campbell, CA (US); Christiaan A. Ligtenberg, San Carlos, CA (US); Charles A. Schwalbach, Menlo Park, CA (US); Derek J. Yap, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 13/492,715

(22) Filed: Jun. 8, 2012

(65) Prior Publication Data

US 2013/0329934 A1 Dec. 12, 2013

(51) Int. Cl.
*H04R 1/02* (2006.01)
*H04R 25/00* (2006.01)

(52) U.S. Cl.
USPC ............................ 381/333; 381/386; 381/306

(58) Field of Classification Search
USPC .................. 381/333, 388, 349, 386, 389, 306
See application file for complete search history.

(56) References Cited

U.S. PATENT DOCUMENTS

2006/0243878 A1* 11/2006 Saad ......................... 248/346.01
2010/0054521 A1* 3/2010 Hung et al. .................... 381/386

* cited by examiner

*Primary Examiner* — Curtis Kuntz
*Assistant Examiner* — Sunita Joshi
(74) *Attorney, Agent, or Firm* — Womble Carlyle Sandridge & Rice LLP

(57) ABSTRACT

A portable computing device can include one or more speakers integrated with internal components. In one embodiment, the speakers can be configured to produce audio output signals and direct at least a portion of the audio signals through vents disposed on a base portion of the portable computing device. In one embodiment, the vents can also direct cooling air into the base portion. In one embodiment, the speakers can also be configured to direct a portion of the audio signal through a speaker grille disposed on the base portion. One embodiment of a speaker enclosure can include a resonant cavity for a first audio transducer formed by the speaker enclosure in cooperation with the base portion of the portable computing device and a second audio transducer configured to direct an audio signal beneath a keyboard.

21 Claims, 14 Drawing Sheets

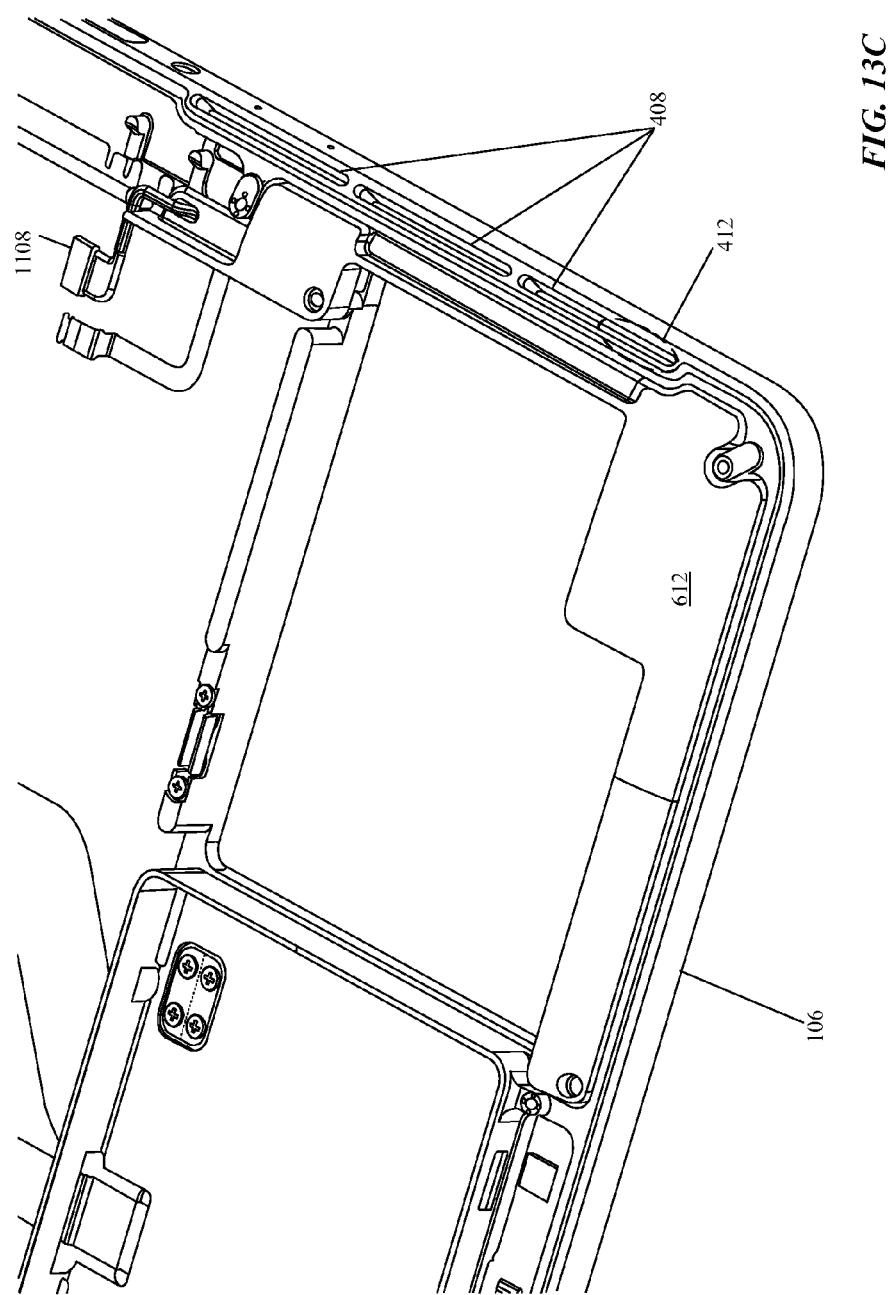

SPEAKER FEATURES OF A PORTABLE COMPUTING DEVICE

TECHNICAL FIELD

The present invention relates generally to portable computing devices. More particularly, the present embodiments relate to microphone arrays for portable computing devices.

BACKGROUND

Portable computing devices have grown in popularity and capability. Early uses for portable computing devices were often limited to simple computing tasks such as number manipulation and word processing. Present applications can include advanced graphical rendering, musical composition, movie and music presentation and more.

In order to support the ever expanding list of applications desired by users, portable computing devices are including more sophisticated components into the space defined by the enclosure of the device. While users expect more performance and features from their portable computing devices, users also want a compact unit; that is, users want the enclosure to be as compact as feasible.

Including high performance speakers in a portable computing device can be difficult, especially as the computing devices becomes more compact and increased audio quality and capability is desired. As the portable computing device becomes smaller, internal component density increases, which can result in a speaker implementation that can yield poor audio performance.

Therefore, it would be beneficial to provide a portable computing device that can support speaker capabilities within design constraints of the enclosure space.

SUMMARY

The present application describes various embodiments regarding systems and methods for producing audio output through speakers for applicable to a portable computing device. In one embodiment, a speaker assembly can include a speaker enclosure, a first transducer affixed to the speaker enclosure including a speaker cone and a speaker coil. The speaker enclosure can include a speaker coil port that can be configured to allow the speaker coil to extend outside the speaker enclosure and an audio output port formed in the speaker enclosure configured to integrate with a vent included in a case for the portable computing device. In one embodiment, the speaker assembly can include a second transducer configured to produce a second audio signal.

In another embodiment, a speaker assembly for a portable computing device can include a speaker enclosure, a first audio transducer coupled to the speaker enclosure configured to produce a first audio signal, a first output port formed by the speaker enclosure configured to guide the first output signal to a vent in a base portion of the portable computing device and a seal configured to seal a first portion of the speaker enclosure to the base portion and form a resonant cavity.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which:

FIGS. 13A, 13B and 13C show one embodiment of a speaker in relation with top case.

DETAILED DESCRIPTION

Figure 1:
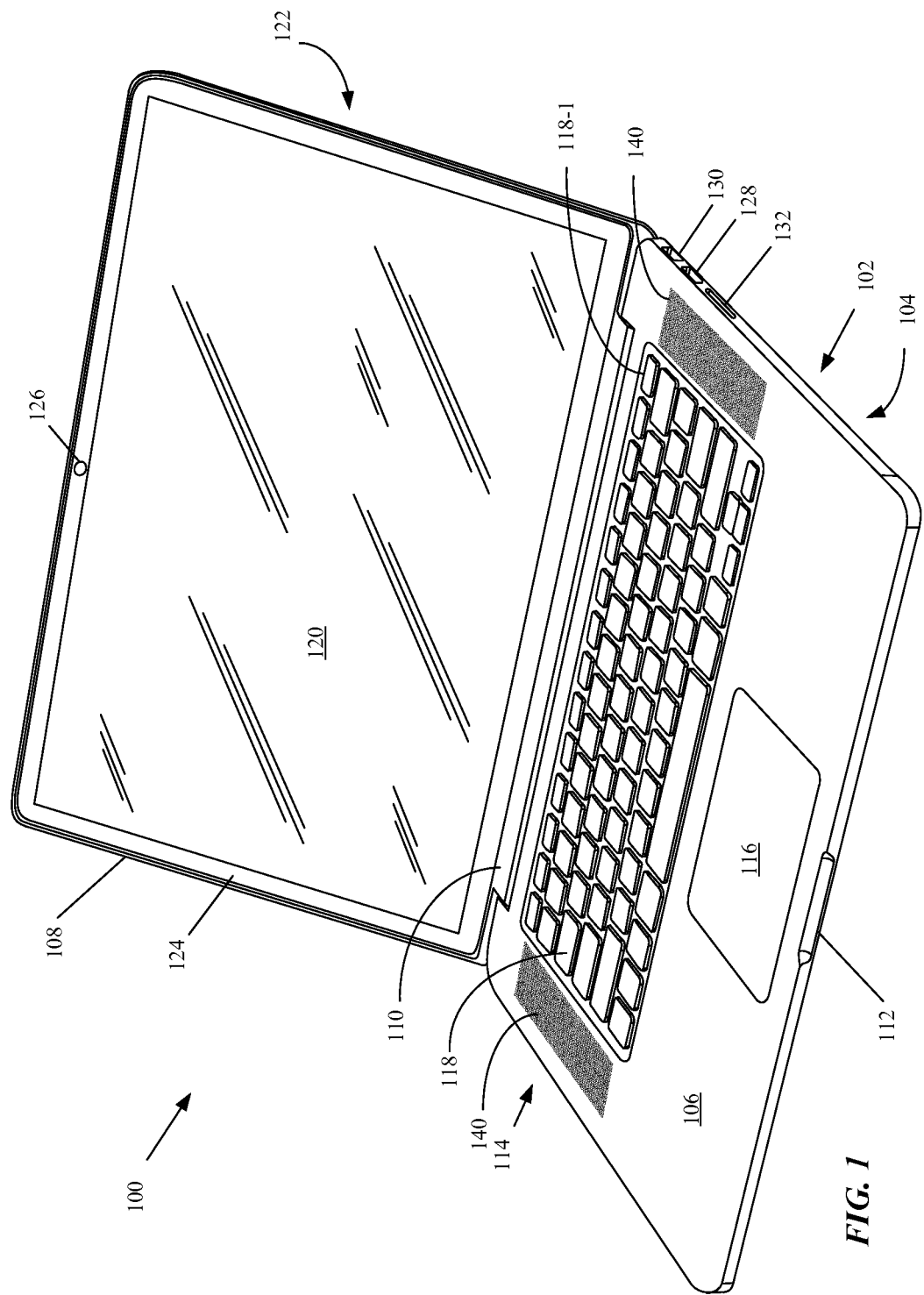
FIG. 1 shows a front facing perspective view of an embodiment of the portable computing device in the form of portable computing device in an open (lid) state.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

In a particular embodiment, the lid and base portion can be pivotally connected with each other by way of what can be referred to as a clutch assembly. The clutch assembly can be arranged to pivotally couple the base portion to the lid. The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

Due at least to the strong and resilient nature of the material used to form the multipart housing; the multipart housing can include a number of openings having wide spans that do not require additional support structures. Such openings can take the form of ports that can be used to provide access to internal circuits. The ports can include, for example, data ports suitable for accommodating data cables configured for connecting external circuits. The openings can also provide access to an audio circuit, video display circuit, power input, etc.

The top case can also include multi-function features that can provide more than one function. For example, vents can be provided on selected sides of the top case. The vents can be shaped to provide a conduit for air flow that can be used to cool internal components such as a CPU or GPU. The vents can also be sized to further limit the transmission of RF energy in the form of EMI from internal components. The vents can also be used to provide additional structural support as well as optionally porting audio from nearby audio components.

The integrated structural features can also provide mounting structures for those internal components mounted to the multi-part housing. Such internal components include a mass storage device (that can take the form of a hard disk drive, HDD, or solid state drive, SSD), audio components (audio jack, microphone, speakers, etc.) as well as input/output devices such as a keyboard and touchpad.

These and other embodiments are discussed below with reference to FIGS. 1-13. However, those skilled in the art will readily appreciate that the detailed description given herein with respect to these figures is for explanatory purposes as the invention extends beyond these limited embodiments.

FIGS. 1-13 show various views of the portable computing device in accordance with various embodiments. FIG. 1 shows a front facing perspective view of an embodiment of the portable computing device in the form of portable computing device 100 in an open (lid) state. Portable computing device 100 can include base portion 102 formed of bottom case 104 fastened to top case 106. Base portion 102 can be pivotally connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad 116. Keyboard 114 can include a plurality of low profile keycap assemblies each having an associated key pad 118. In one embodiment, an audio transducer (not shown) can use selected portions of keyboard 114 to output audio signals such as music. In the described embodiment, a microphone can be located at a side portion of top case 106 that can be spaced apart to improve frequency response of an associated audio circuit.

Each of the plurality of key pads 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of portable computing device 100. In order to reduce component count, a keycap assembly can be re-provisioned as a power button. For example, key pad 118-1 can be used as power button 118-1. In this way, the overall number of components in portable computing device 100 can be commensurably reduced.

Touch pad 116 can be configured to receive finger gesturing. A finger gesture can include touch events from more than one finger applied in unison. The gesture can also include a single finger touch event such as a swipe or a tap. The gesture can be sensed by a sensing circuit in touch pad 116 and converted to electrical signals that are passed to a processing unit for evaluation. In this way, portable computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120.

Display 120 can display visual content such as a graphical user interface, still images such as photos as well as video media items such as movies. Display 120 can display images using any appropriate technology such as a liquid crystal display (LCD), OLED, etc. Portable computing device 100 can also include image capture device 126 located on a transparent portion of display trim 124. Image capture device 126 can be configured to capture both still and video images. Lid portion 108 can be formed to have uni-body construction that can provide additional strength and resiliency to lid portion 108 which is particularly important due to the stresses caused by repeated opening and closing. In addition to the increase in strength and resiliency, the uni-body construction of lid portion 108 can reduce overall part count by eliminating separate support features.

Data ports 128-132 can be used to transfer data and/or power between an external circuit(s) and portable computing device 100. Data ports 128-132 can include, for example, input slot 128 that can be used to accept a memory card (such as a FLASH memory card), data ports 130 and 132 can take be used to accommodate data connections such as USB, FireWire, Thunderbolt, and so on. In some embodiments, speaker grille 134 can be used to port audio from an associated audio component enclosed within base portion 102.

Figure 2:
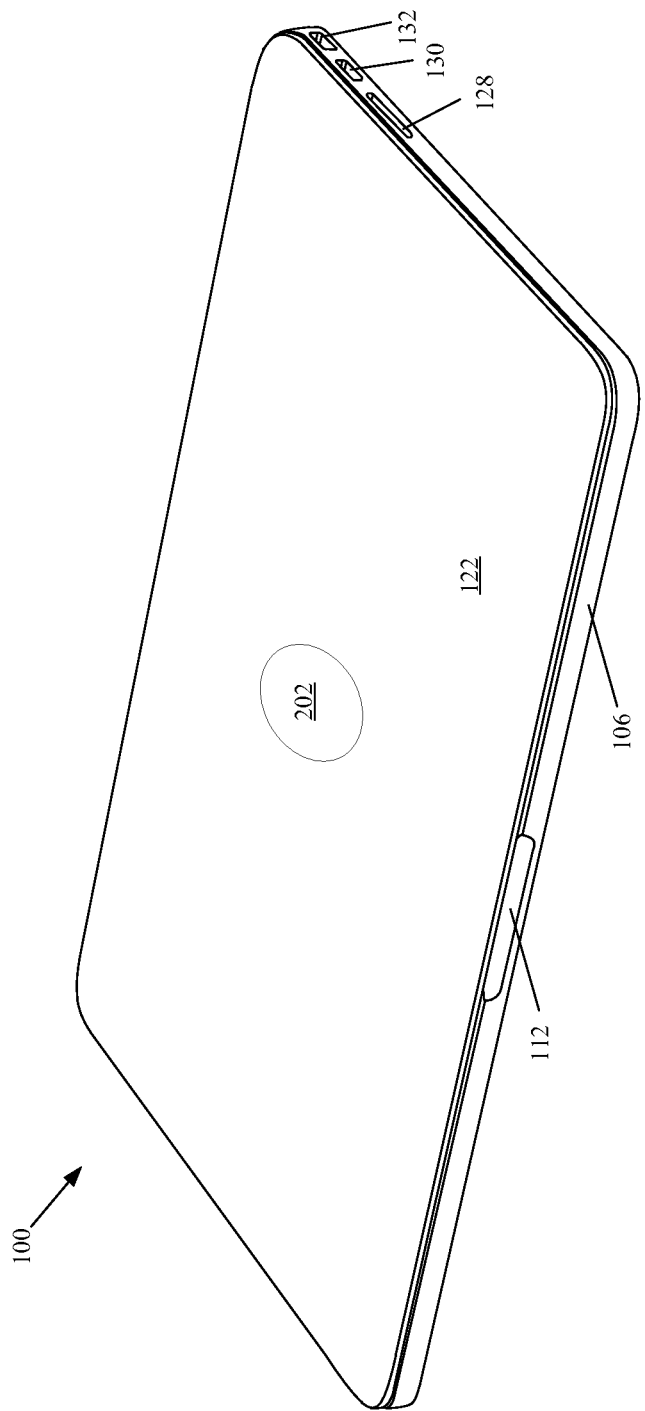
FIG. 2 shows portable computing device in a closed (lid) configuration that shows rear cover and logo.

FIG. 2 shows portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3:
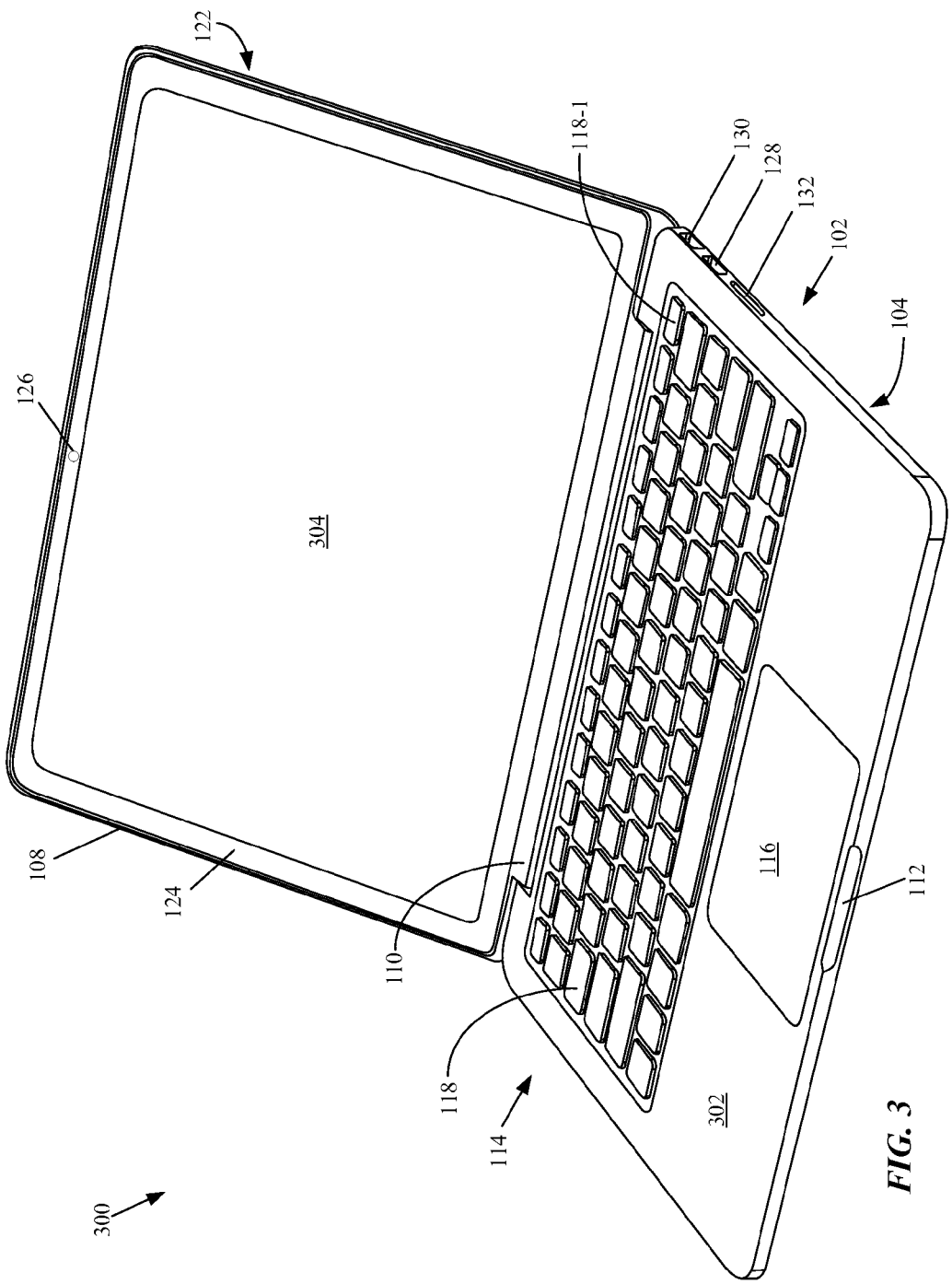
FIG. 3 shows another embodiment of the portable computing device in the form of portable computing device also in the open state.

FIG. 3 shows another embodiment in the form of portable computing device 300 that is smaller than portable computing device 100. Since portable computing device 300 is smaller in size than portable computing device 100, certain features shown in FIG. 1 are modified, or in some cases lacking, in portable computing device 300. For example, base portion 302 can be reduced in size such that separate speakers (such as speaker grid 134) are replaced with an audio port embodied as part of keyboard 114. However, bottom case 304 and top case 306 can retain many of the features described with regards to portable computing device 100 (such as display 120 though reduced to an appropriate size).

Figure 4:
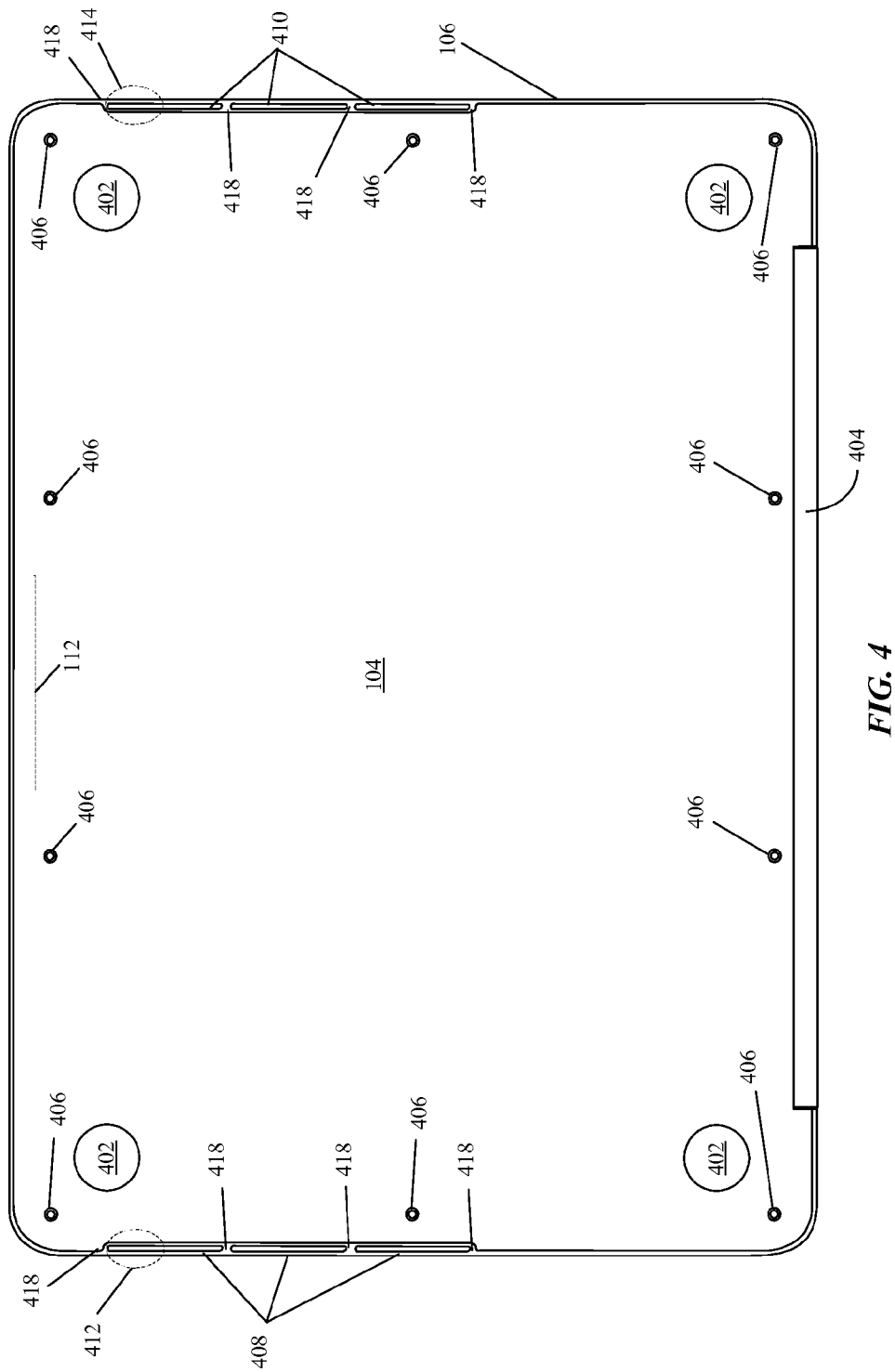
FIG. 4 shows an external view of bottom case.

FIG. 4 shows an external view of bottom case 104 showing relative positioning of support feet 402, insert 112, cosmetic wall 404 that can be used to conceal clutch assembly 110 and fasteners 406 used to secure bottom case 104 and top case 106 together. Support feet 402 can be formed of wear resistant and resilient material such as plastic. Also in view are multi-purpose front side sequentially placed vents 408 and 410 that can be used to provide a flow of outside air that can be used to cool internal components. In the described embodiment, vents 408 and 410 can be placed on an underside of top cover 106 in order to hide the vents from view as well as obscure the view of an interior of portable computing device 100 from the outside. Vents 408 and 410 can act as a secondary air intake subordinate to primary air intake vents located at a rear portion of portable computing device 100 (described below). In this way, vents 408 and 410 can help to maintain an adequate supply of cool air in those situations where portions of the rear vents are blocked or otherwise have their air intake restricted.

Vents 408 and 410 can also be used to output audio signals in the form of sound generated by an audio module (not shown). In one embodiment, a selected portion (such as portions 412 and 414) can be used to output sound at a selected frequency range in order to improve quality of an audio presentation by portable computing device 100. Vents 408 and 410 can be part of an integrated support system in that vents 408 and 410 can be machined from the outside and cut from the inside during fabrication of top case 106. As part of the machining of vents 408 and 410, stiffener ribs 416 (shown in FIG. 5) can be placed within vent openings 408 and 410 to provide additional structural support for portable computing device 100. Stiffener ribs 416 can be formed using what is referred to as a T cutter that removes material subsequent to the formation of the vent openings during the fabrication of top case 106.

Moreover, trusses 418 can be formed between vents 408 and 410 in combination with ribs 416 can add both structural support as well as assist in defining both the cadence and size of vents 408 and 410. The cadence and size of vents 408 and 410 can be used to control air flow into portable computing device 100 as well as emission of RF energy in the form of EMI from portable computing device 100. Accordingly, stiffener ribs 416 can separate an area within vents 408 and 410 to produce an aperture sized to prevent passage of RF energy. As well known in the art, the size of an aperture can restrict the emission of RF energy having a wavelength that can be "trapped" by the aperture. In this case, the size of vents 408 and 410 is such that a substantial portion of RF energy emitted by internal components can be trapped within portable computing device 100. Furthermore, by placing vents 408 and 410 at a downward facing surface of top case 106, the aesthetics of portable computing device 100 can be enhanced since views of internal components from an external observer are eliminated.

Figure 5:
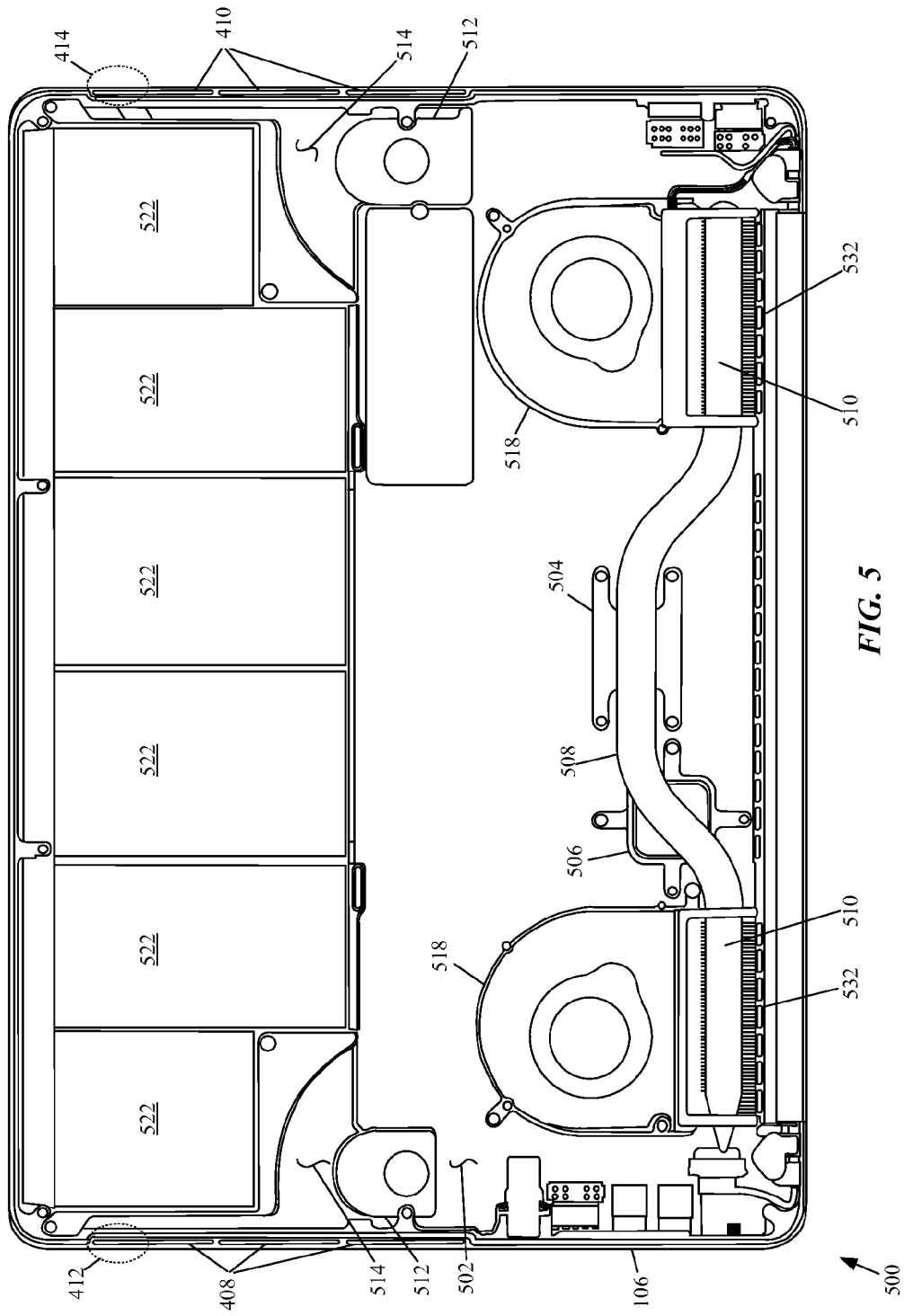
FIG. 5 is a diagram illustrating internal components of portable computing device.

FIG. 5 is a diagram 500 illustrating internal components of portable computing device 100 when bottom case 104 is detached from top case 106. The internal components are shown in relationship to each other. In other embodiments, the physical relationship of the internal components can be different. FIG. 5 is an internal view of the portable computing device 100, looking into the top case 106, with the bottom case 104 removed. The top case 106 can include a main logic board (MLB) 502. MLB 502 can include a processor, memory, wireless communication devices such as devices for IEEE 802.11 compliant signals and Bluetooth® signals. MLB 502 can also include other communication interfaces such as Ethernet and/or Universal Serial Bus (USB) connectors. MLB 502 can also include user input and output interfaces, such as interfaces for keyboard 114, touchpad 116, display 120 and the like.

MLB 502 can include a processor (CPU) to execute program instructions. The CPU can be cooled, at least in part, with CPU heat sink 504. In one embodiment, MLB 502 can include graphics processing unit (GPU) to render and display graphical information on display 120. The GPU can be cooled, at least in part, with GPU heat sink 506. To enhance cooling, CPU heat sink 504 and GPU heat sink 506 can be coupled to heat pipe 508. Heat pipe 508 can convey heat from the CPU and GPU to fan outlets 510. Fans 518 can draw cooling air in vents 408, 410 and exhaust air across heat pipe 508 to rear vents 532.

Portable computing device 100 can include speakers 512 for producing audio signals for the user. In one embodiment, speakers 512 can include at least two transducers: a first transducer for relatively high frequency signals and a second transducer for relatively low frequency signals. Speakers 512 can also include air channels 514 to help direct air intake flow from vents 408, 410 to fans 518. Combining air channels 514 with speakers 512 can advantageously conserve space within the portable computing device 100. A portion of vents 408, 410 can be used to output audio signals from speakers 512. In one embodiment, portion 412 and portion 414 can be coupled to speakers 512 and couple lower frequency audio signals from speakers 512 to outside of top case 106.

Portable computing device 100 can include one or more batteries 522. In one embodiment, six batteries 522 can be combined to provide battery charge capacity to power portable computing device 100 and any connected peripherals.

Figure 6:
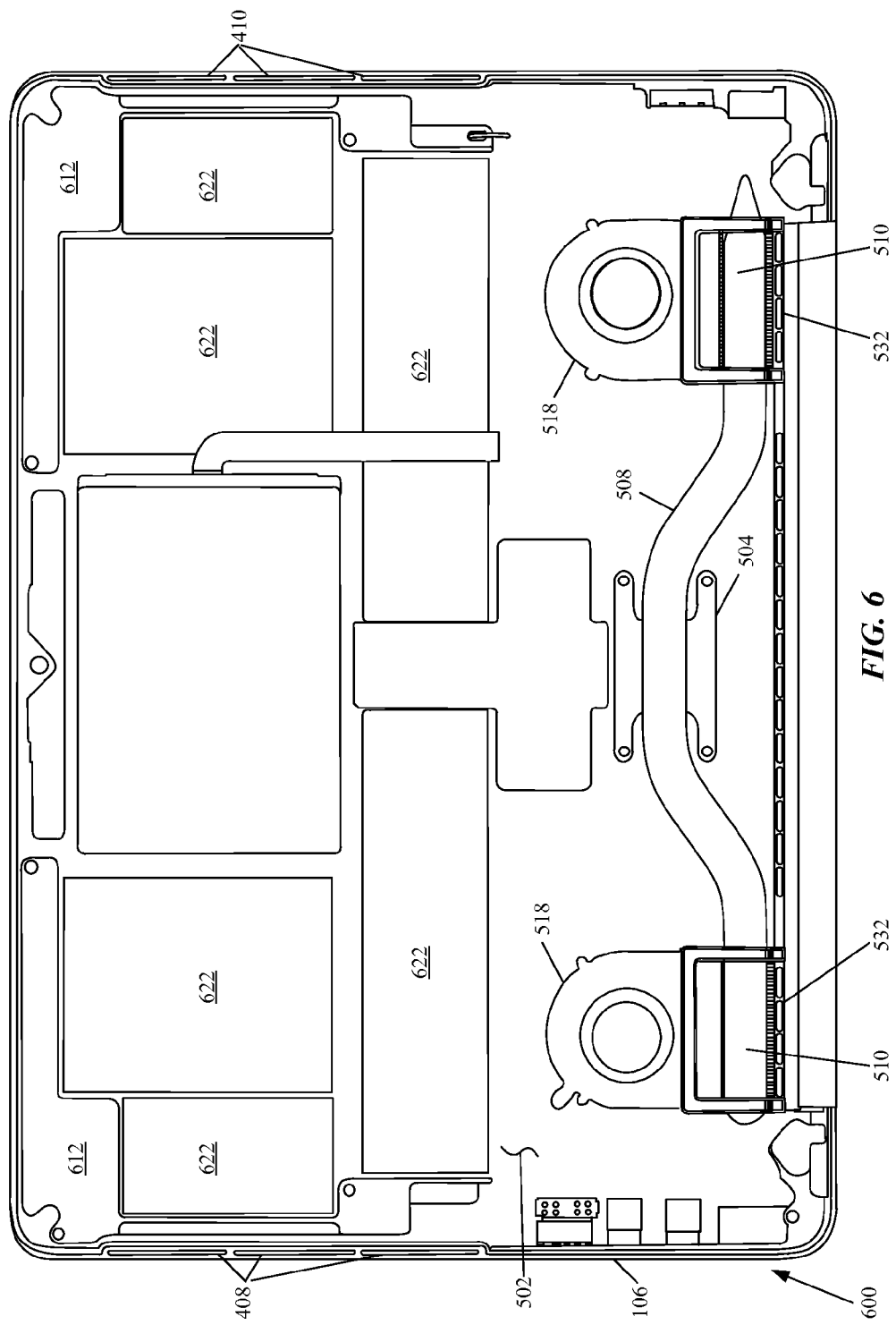
FIG. 6 is a diagram illustrating internal components of another embodiment of the portable computing device.

FIG. 6 is a diagram 600 illustrating internal components of another embodiment of portable computing device 100 when bottom case 104 is detached from top case 106, in accordance with one embodiment of the specification. This embodiment can be a size reduced version of the embodiment of FIG. 5. Personal computing device 100 can include MLB 502 affixed to top case 106. Fans 518 can draw cooling air through vents 408, 410 and can exhaust air though rear vents 532. A CPU can be cooled with CPU heat sink 504 and heat sink 504 can be coupled to heat pipe 508. Heat pipe 508 can convey heat from CPU heat sink 504 to fan outlets 510. In some embodiments, the GPU can be omitted from the portable computing device thereby eliminating the need for GPU heat sink 506. Air from fans 518 is exhausted through fan outlets 510 to rear vents 532.

Power for portable computing device 100 can be supplied by batteries 622. In one embodiment, batteries 622 can be disposed within different locations within top case 106, when compared to batteries 522 in FIG. 5. Portable computing device 100 can include speakers 612 to producing audio signals for the user. In one embodiment, speakers 612 can be relatively smaller than speakers 512 to accommodate a smaller overall size of a portable computing device. In one embodiment, at least a first portion of an audio signal produced by speakers 612 can be directed through keyboard 114 (not shown). At least a second portion of the audio signal produced by speakers 612 can be directed out vents 408, 410.

Figure 7A:
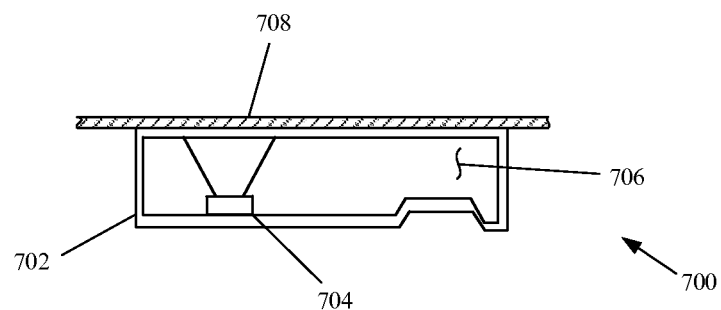
FIGS. 7A-7B are simplified views of embodiments of speaker assemblies in accordance with embodiments of the specification.
Figure 7B:
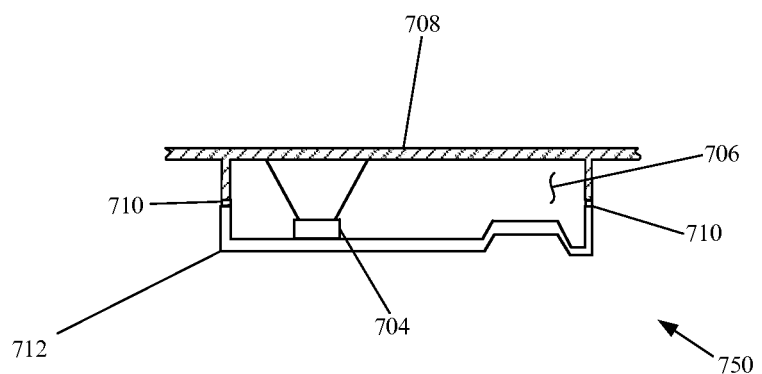

FIGS. 7A-7B are simplified views of embodiments of speaker assemblies in accordance with embodiments of the specification. Speaker assembly 700 shown in FIG. 7A includes a speaker enclosure 702 defining a volume that can function as an acoustic cavity 706 for speaker 704. Speaker assembly 702 can be coupled to case 708. For example, case 708 can be an enclosure for portable computing device 100. FIG. 7B shows another embodiment of a speaker assembly 750 where acoustic cavity 706 for speaker 704 can be defined by a volume created by speaker enclosure 712 in cooperation with case 708. An overall reduction in height can be realized with speaker assembly 750 since case 708 is used to form at least a portion of a complete speaker enclosure. In some embodiments seal 710 can be used at an interface between speaker enclosure 712 and case 708 to better define acoustic cavity 706.

Figure 8A:
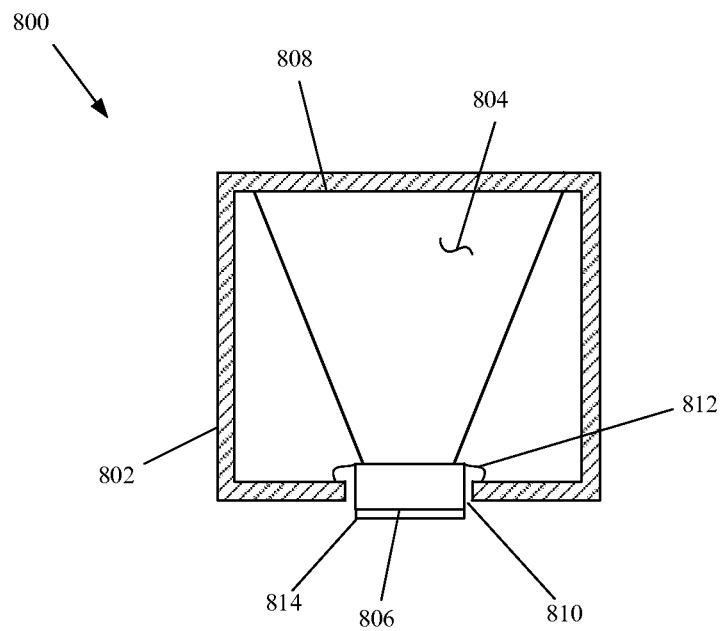
FIGS. 8A-8B are simplified views of other embodiments of a speaker assembly.
Figure 8B:
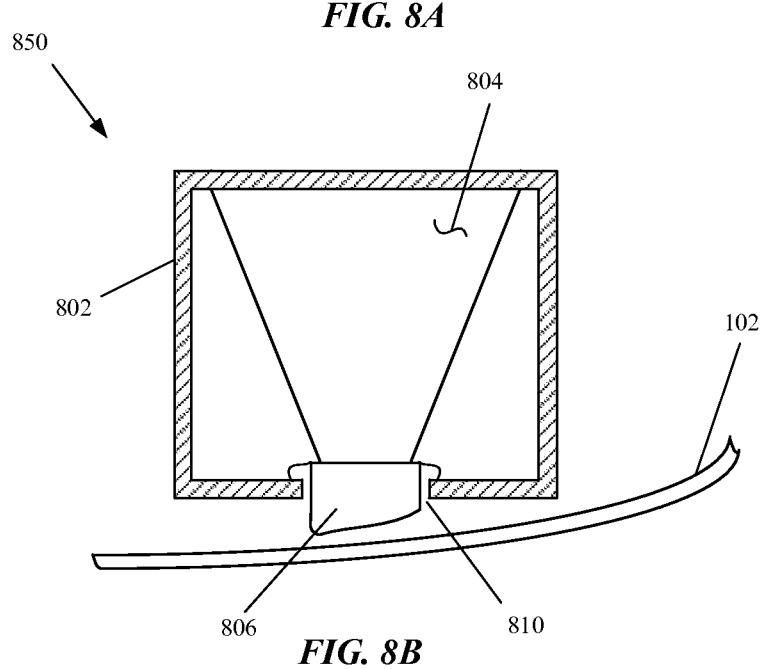

FIGS. 8A-8B are simplified views of other embodiments of a speaker assembly. These views are meant to convey concepts and principles related to speaker assemblies in accordance with embodiments described in the specification. Those skilled in the art will appreciate that figures may not be drawn to scale and the drawings may not be accurate representations of optimal shapes.

Speaker assembly 800 in FIG. 8A can include enclosure 802, speaker cone 804 and speaker coil 806. Speaker enclosure 802 can provide a mounting region 808 for speaker cone 804. Speaker coil 806 can receive electrical signals that can cause the speaker cone 804 to translate and create an audible audio signal. Enclosure 802 can include a speaker coil port 810 that can allow speaker coil 806 to extend, at least in part, outside of speaker enclosure 802. Arranging the speaker coil 806 in this manner can enable a relatively larger speaker cone to be supported when compared to a similarly sized enclosure with a speaker coil fully contained. Also, extending speaker coil 806 outside speaker enclosure 802 can reduce heat build-up that can be otherwise captured within a speaker enclosure 802.

Speaker assembly 800 can include seal 812 that can seal speaker coil 806 to speaker enclosure 802. Seal 812 can prevent foreign objects or debris from entering speaker enclosure 802. Additionally, seal 812 can help form an acoustic seal to improve performance of speaker assembly 800. Speaker assembly 800 can also include cosmetic cover 814 coupled to speaker coil 806. Cosmetic cover 814 can enhance visual aspects of speaker assembly 800.

FIG. 8B is another embodiment of a speaker assembly 850. Speaker assembly 850 can be similar to many aspects of speaker enclosure 800 and include speaker enclosure 802, speaker cone 804 and speaker coil port 810 arranged to allow speaker coil 806 to extend outside speaker enclosure 802. In this environment, protruding surface of speaker coil 806 can be shaped to enable deployment in some limited space embodiments. For example, if speaker assembly 850 is mounted in such an area that a surface of speaker coil 806 can be near an object, such as a base portion 102 of portable computing device 100, then the surface of speaker coil 806 can be shaped to provide a clearance region near base portion 102. In one embodiment, speaker coil 806 can be combined with cosmetic cover 814 to form shaped speaker coil 806.

Figure 9:
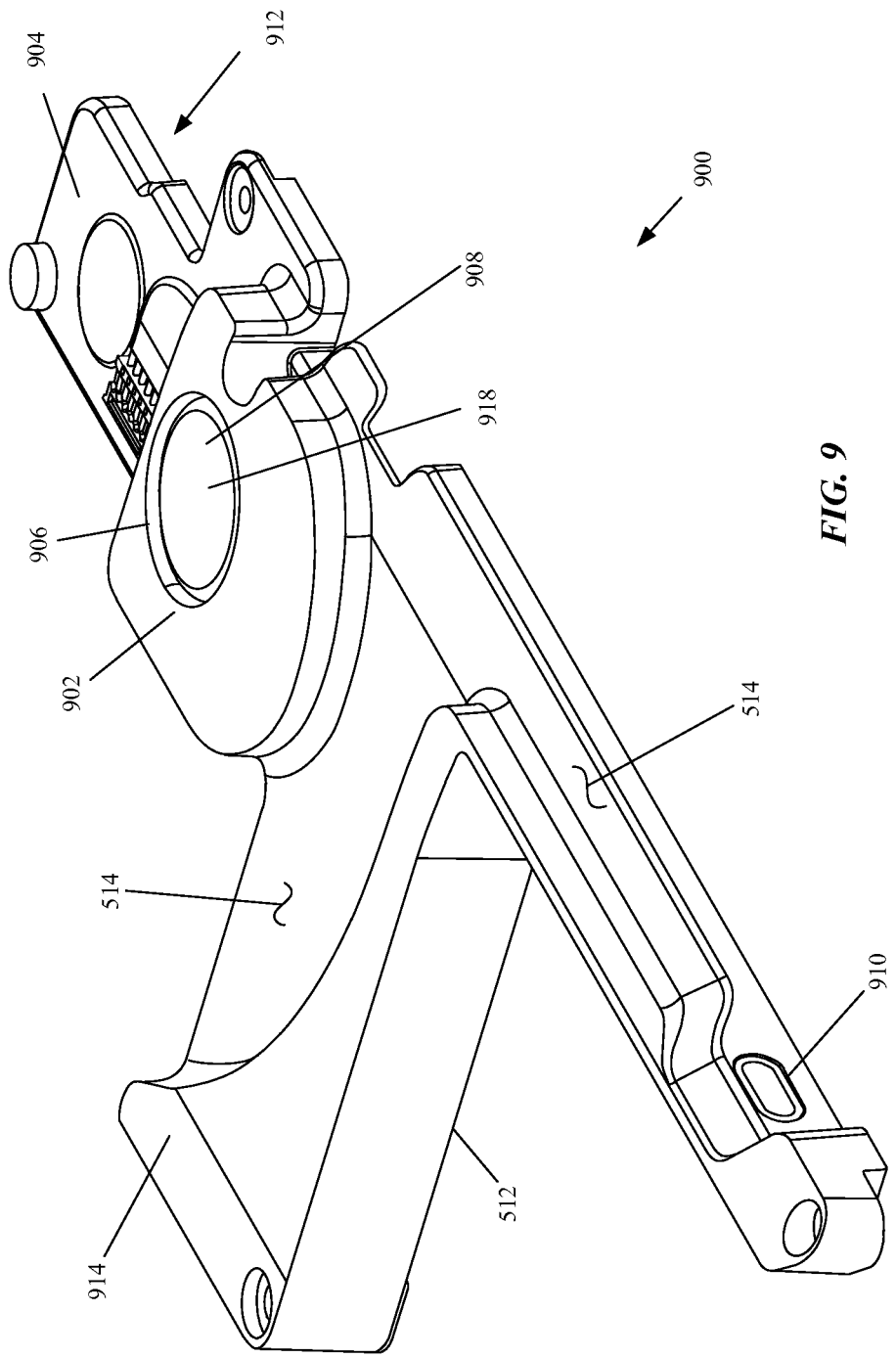
FIG. 9 shows one embodiment of a speaker assembly.

FIG. 9 shows one embodiment of a speaker assembly realized as speaker 512 from FIG. 5. Speaker 512 can be configured to cooperatively fit with internal components in computing device 100, particularly a larger embodiment, such as the one shown in FIG. 5. Speaker 512 can include two transducers for producing audible audio signals. A first transducer can be a larger transducer configured to produce generally lower frequency sounds. The first transducer can be located in first transducer region 902 and speaker coil 908 can be associated with the first transducer and can extend into speaker coil port 906. Speaker 512 can also include low frequency audio port 910 that can integrate with vents 408 and 410 (as shown in FIG. 4) such that lower frequency audio signals can exit low frequency audio port 910, and through portions 412 and 414 within vents 408 and 410.

Speaker 512 can include a second transducer that can be configured to produce generally higher frequency sounds. The second transducer (hidden from view) can be located within second transducer region 904. Higher frequency sounds can be produced in high frequency sound area 912. In one embodiment, high frequency sound area 912 can generally align with speaker grille 134 on top case 106 (shown in FIG. 1). Thus, in one embodiment, speaker 512 can be configured to produce both higher frequency and lower frequency audible sounds and can route those sounds to the user in cooperation with the base portion 102 of the portable computing device 100.

Speaker 512 can also include support zone 914. Support zone 914 can add support between top case 106 and bottom case 104 when speaker 512 is affixed to top case 106. Referring back to FIG. 5, speaker 512 can be configured to provide additional support with support zone 914 near batteries 522. In one embodiment, support zone 914 can help prevent undue or excessive force from being applied to batteries 522.

Speaker 512 can also include air channels 514 that can be configured to guide cooling air within top case 106. Cosmetic cover 918 can be coupled to speaker coil 908 to enhance visual aspects of speaker 512.

Figure 10:
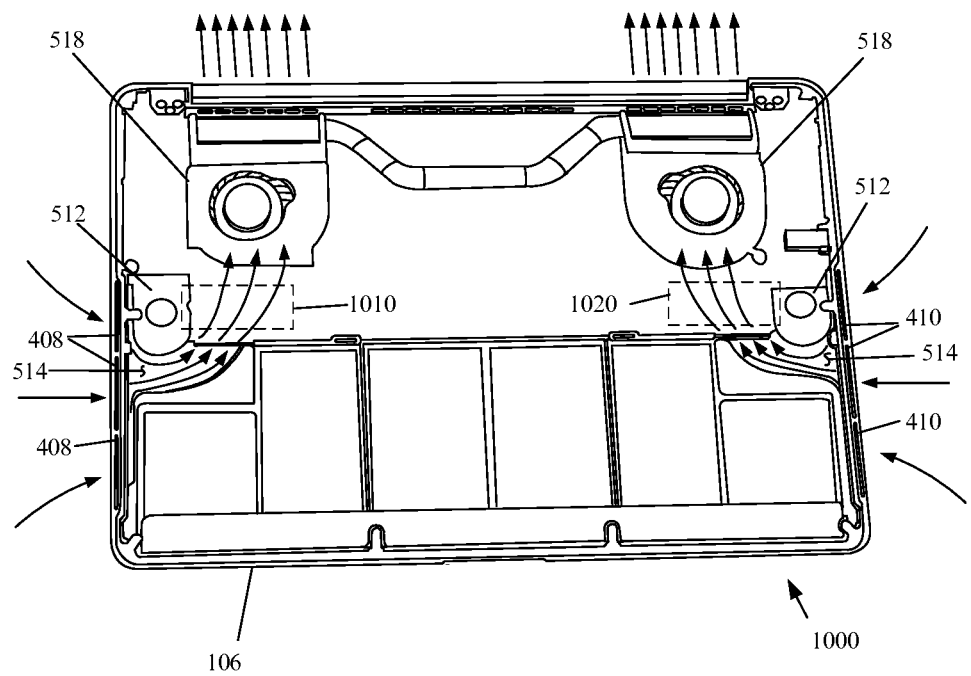
FIG. 10 is an air flow diagram for one embodiment of portable computing device.

FIG. 10 is an air flow diagram 1000 for one embodiment of portable computing device 100. Top case 106 is shown with vents 408 and 410 disposed on opposing sides. Air can be drawn through vents 408 and 410 by fans 518. Air channels 514 provided by speakers 512 can advantageously direct air flow (shown by arrows) within portable computing device 100. Dashed line areas 1010 and 1020 can represent areas that can support other electrical or electronic subsystems. Air flow over subsystems in these areas can enable better performance for these subsystems.

In other embodiments, space may be limited in top case 106, reducing or eliminating speaker openings that can allow audio to be conveyed from internal speakers. For example, the portable computing device 100 shown in FIG. 3 lacks speaker grills 140 shown in FIG. 1. In one embodiment, regions of top case 106 can be configured to allow audio from internal speakers to propagate from underneath a region near keyboard 114.

Figure 11:
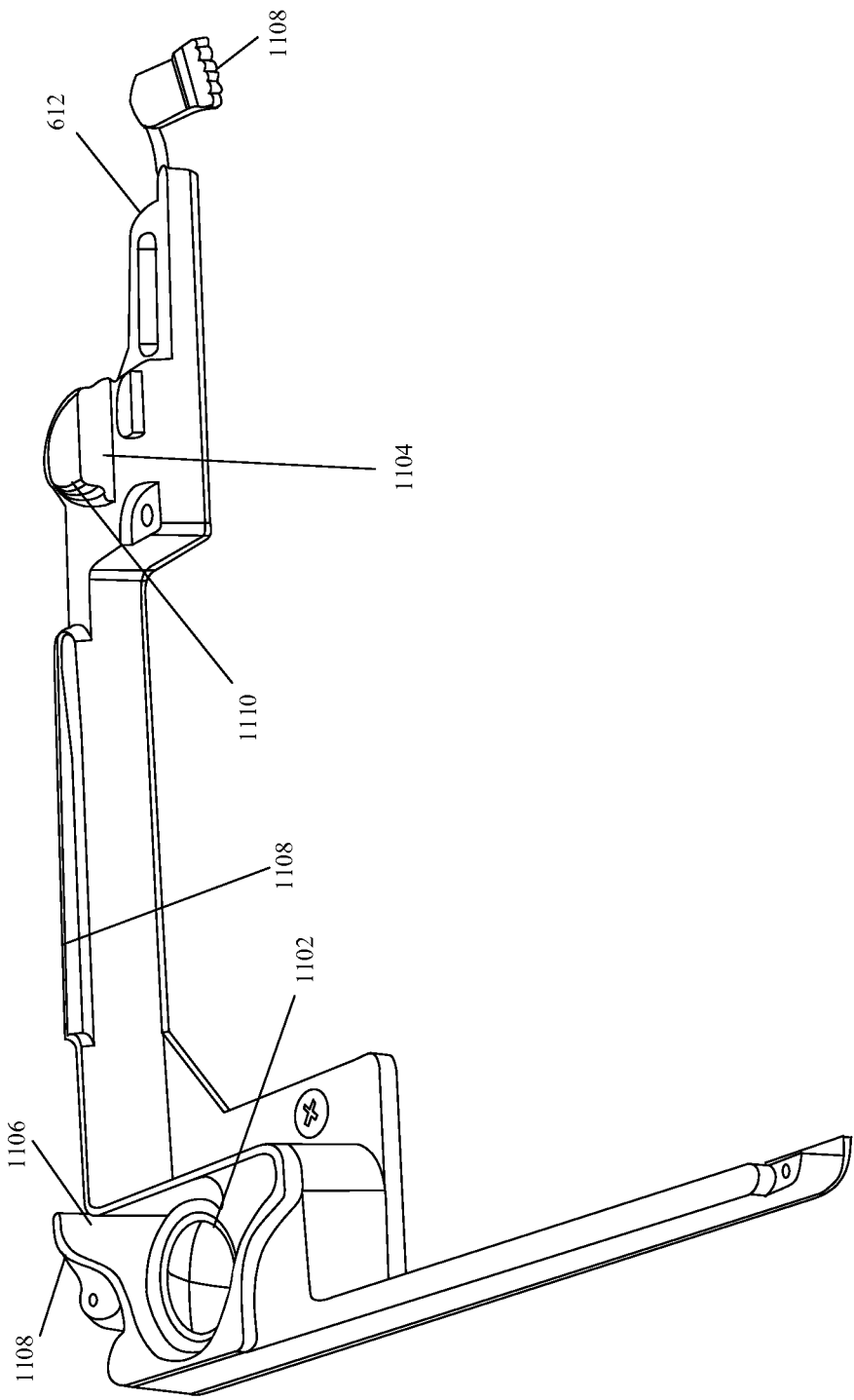
FIG. 11 shows another embodiment of a speaker assembly.

FIG. 11 shows another embodiment of a speaker assembly realized as speaker 612 from FIG. 6. Speaker 612 can include two transducers for producing audible audio signals. First transducer 1102 can be a larger transducer configured to produce generally lower sounds. Audio from first transducer 1102 can be directed toward a vent by low frequency audio port 1106. Low frequency audio port 1106 can integrate with vents 408 and 410 and portions 412 and 414 to direct audio toward the user. Speaker 612 can include seal 1108 that can couple speaker 612 to top case 106 increasing, at least in part, speaker efficiency.

Speaker 612 can include a second transducer that can be configured to produce generally higher frequency sounds. The second transducer (hidden from view) can be located within second transducer region 1110. Audio form the second transducer can be directed through high frequency audio port 1104. In one embodiment, high frequency audio port 1104 can be positioned in an opening in top case 106 near keyboard 114 region so that audio from audio port 1104 can be directed upward though keyboard 114. Directing lower frequencies through low frequency audio port 1106 instead of through high frequency output port 1104 can improve audio performance, at least in part, since lower frequencies can induce unwanted vibrations or rattles through keyboard 114.

Figure 12:
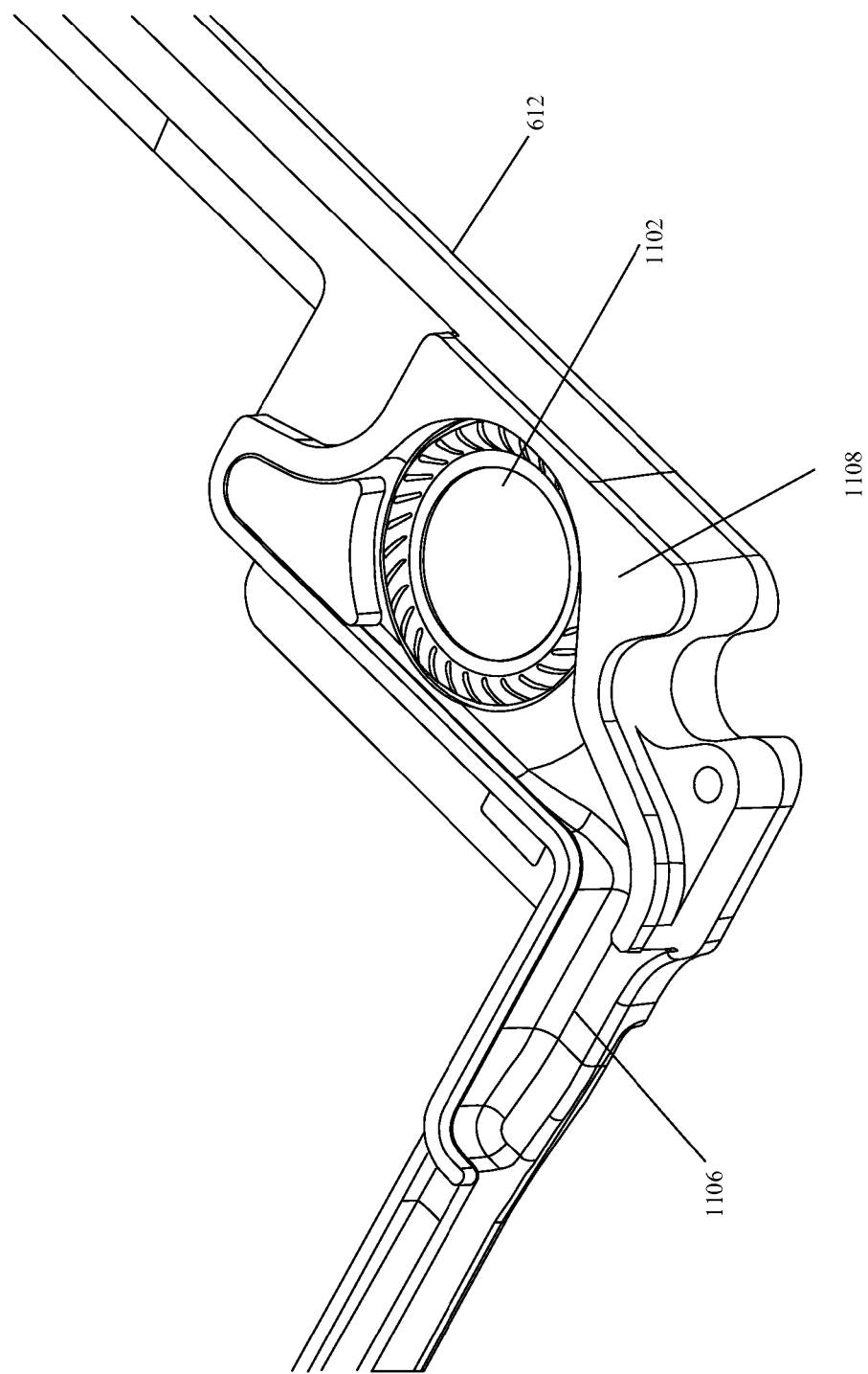
FIG. 12 shows another view of a speaker more clearly illustrating a low frequency audio port.

FIG. 12 shows another view of speaker 612 more clearly illustrating low frequency audio port 1106. First transducer 1102 can be configured to produce lower frequency sound that can be directed through low frequency audio port 1106 and through vents 408 and 410. Seal 1108 can cooperate with low frequency audio port 1106 to direct audio sounds.

Figure 13A:
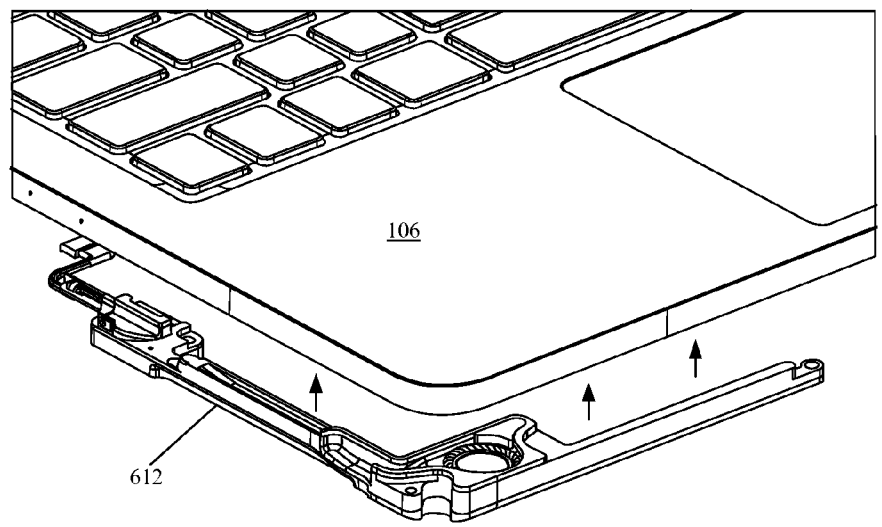
Figure 13B:
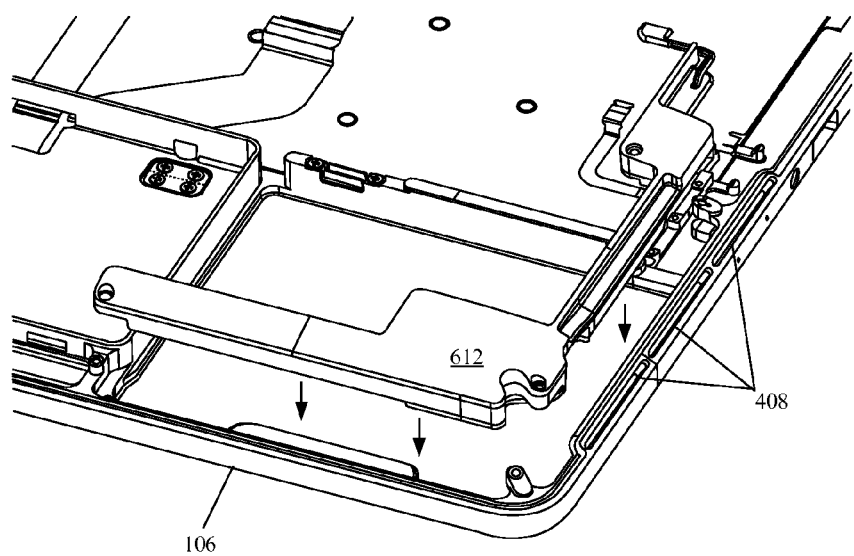

FIGS. 13A, 13B and 13C show speaker 612 in relation with top case 106. Although the figures show only one corner of top case 106, another corner can be configured to be substantially similar. FIG. 13A is a top view of top case 106 and shows approximately how speaker 612 can integrate with top case 106. FIG. 13B is an internal view of top case 106 and more clearly shows the integration between speaker 612 and top case 106. In particular, FIG. 13B shows the relationship of low frequency audio port 1106 with vents 408. FIG. 13C shows speaker 612 positioned within top case 106. Hidden from view is low frequency audio port 1108 positioned to direct audio through portion 412 of vents 408. Connector 1108 can couple speaker 612 to an audio amplifier on MLB 502 (not shown).

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A speaker assembly for a portable computing device, comprising:
   a speaker enclosure;
   a first transducer affixed to the speaker enclosure, comprising: a speaker cone, and a speaker coil;
   a speaker coil port disposed through the speaker enclosure that allows the speaker coil to extend outside of the speaker enclosure, the speaker coil port comprising: a seal that cooperates with the speaker coil to prevent contaminates from entering the speaker enclosure through the speaker coil port; and
   an audio output port formed in the speaker enclosure configured to integrate with a vent disposed on a case of the portable computing device.

2. The speaker assembly of claim 1, wherein the speaker cone is configured to produce an audio signal that is coupled to the audio output port.

3. The speaker assembly of claim 1, further comprising:
   a second transducer, separate from the first transducer, configured to output a second audio signal through speaker grilles of the portable computing device.

4. The speaker assembly of claim 1, wherein the speaker enclosure comprises a plurality of walls defining an air channel configured to guide cooling air around the first transducer as it flows through the portable computing device.

5. The speaker assembly of claim 1, wherein the speaker enclosure further comprises a seal to couple at least one portion of the speaker enclosure to a base portion of the portable computing device.

6. The speaker assembly of claim 5, wherein the base portion forms at least a portion of the speaker enclosure.

7. The speaker assembly of claim 1, wherein a protruding end of the speaker coil includes a cosmetic cover.

8. The speaker assembly of claim 7, wherein the cosmetic cover is configured to conform to at least a portion of a base portion of the portable computing device.

9. The speaker assembly of claim 1, further comprising a support zone configured to protect internal components of the portable computing device from excessive pressure.

10. A speaker assembly for a portable computing device, comprising:
    a speaker enclosure;
    an audio transducer coupled to an interior surface of the speaker enclosure, the audio transducer comprising a speaker coil, wherein a portion of the speaker coil extends out of the speaker enclosure through a coil opening in the speaker enclosure; and
    an acoustic seal disposed around an edge of the speaker enclosure that defines the coil opening, wherein the acoustic seal cooperates with the speaker coil to close the coil opening.

11. The speaker assembly of claim 10, wherein the audio transducer is a first audio transducer that generates a first audio signal and wherein the speaker assembly further comprises a second audio transducer configured to direct a second audio signal to a keyboard region of the portable computing device.

12. The speaker assembly of claim 11, further comprising a support zone configured to add strength to at least one region of the portable computing device.

13. The speaker assembly of claim 11, wherein the first audio signal is a lower frequency audio signal.

14. The speaker assembly of claim 13 wherein the second audio signal is a higher frequency audio signal.

15. The speaker assembly of claim 10, wherein the speaker enclosure further comprises a plurality of exterior surfaces that define an air channel configured to guide cooling air in the portable computing device.

16. A portable computing device, comprising:
    a housing; and
    an audio module disposed within the housing, the audio module comprising:
      an enclosure,
      a speaker coil port defining an opening extending into the enclosure, the speaker coil port comprising a seal disposed about a periphery of the opening, and
      a first transducer disposed at least partially within the enclosure, the first transducer comprising a speaker coil, at least a portion of the speaker coil extending outside of the enclosure through the speaker coil port, wherein the speaker coil and the seal cooperate to close the opening defined by the speaker coil port.

17. The portable computing device of claim 16, wherein the audio module further comprises an audio output port disposed on the enclosure that directs a portion of an audio signal produced by the first transducer through a side vent of a housing of the portable computing device.

18. The portable computing device of claim 16, wherein the first transducer is configured to produce a first audio signal, and wherein the audio module further comprises a second transducer disposed within the enclosure that is configured to produce a second audio signal.

19. The portable computing device of claim 18, wherein the housing further comprises a speaker grill disposed along a top surface of the housing, and wherein the second audio signal is directed through the speaker grill.

20. The portable computing device of claim 16, wherein the enclosure of the audio module further comprises a plurality of exterior surfaces that cooperate to define a channel that directs air around the first transducer and towards heat emitting operational components of the portable computing device.

21. The portable computing device of claim 16, wherein the first transducer utilizes air trapped between a surface of the enclosure and an interior surface of the housing as a back volume of air to enhance audio produced by the first transducer.

\* \* \* \* \*